United States Patent [19]

Ghandehari

[11] Patent Number: 5,537,297

[45] Date of Patent: Jul. 16, 1996

[54] IMAGE REFLECTING LIGHT GUIDE

[75] Inventor: Abbas Ghandehari, Huntington Beach, Calif.

[73] Assignee: Editha S. Shemke, Huntington Beach, Calif.

[21] Appl. No.: 278,727

[22] Filed: Jul. 21, 1994

Related U.S. Application Data

[63] Continuation-in-part of Ser. No. 92,601, Jul. 15, 1993, abandoned.

[51] Int. Cl.$^6$ ............................................. F21V 8/00
[52] U.S. Cl. ................................................ 362/32; 362/208
[58] Field of Search ............................ 362/32, 208, 157, 362/298

[56] References Cited

U.S. PATENT DOCUMENTS

| | | | |
|---|---|---|---|
| 1,785,341 | 12/1930 | Fisher . | |
| 1,839,534 | 1/1932 | Cole . | |
| 1,847,534 | 3/1932 | Neuhut et al. . | |
| 2,062,887 | 12/1936 | Karst | 40/132 |
| 2,173,371 | 9/1938 | Penoyer | 362/32 |
| 2,362,157 | 11/1944 | Quill | 40/130 |
| 2,431,091 | 11/1947 | Thomas | 362/32 |
| 2,486,859 | 11/1949 | Meijer et al. | 40/134 |
| 2,611,019 | 9/1952 | Warner | 362/208 |
| 3,208,174 | 9/1965 | Wrenshall | 362/32 |
| 3,497,981 | 3/1970 | Tyne | 362/32 |
| 3,890,497 | 6/1975 | Rush | 362/32 |
| 3,978,599 | 9/1976 | Berber | 40/132 R |
| 4,077,146 | 3/1978 | Nasgowitz | 40/564 |
| 4,231,077 | 10/1980 | Joyce et al. | 362/32 |
| 4,373,283 | 2/1983 | Swartz | 40/564 |
| 4,585,298 | 4/1986 | Mori | 362/32 |
| 4,601,120 | 7/1986 | Levin | 40/317 |
| 4,750,798 | 6/1988 | Whitehead | 362/32 |
| 4,775,920 | 10/1988 | Seibert et al. | 362/32 |
| 4,912,605 | 3/1990 | Whitehead | 362/32 |
| 4,976,057 | 12/1990 | Bianchi | 40/579 |

Primary Examiner—Richard R. Cole

[57] ABSTRACT

An apparatus is provided for reflecting light, and includes a transparent tube having two end surfaces and a cylindrical side wall. A light source includes both an illuminating light beam and a tube holding member that holds at least one of the end surfaces close to the light source so that the light beam propagates through at least one of the end surfaces and then along the tube. A color light filter may be positioned between the light source and at least one end surface of the tube so that the color of the light beam is selectable. At least one opaque thin film strip is adhered to or etched into a minor portion of the circumference of the outer surface for reflecting a portion of the light beam transversely through the tube such that the portion of the light beam is visible along the side wall of the tube.

9 Claims, 2 Drawing Sheets 5,537,297

IMAGE REFLECTING LIGHT GUIDE

This application is a File Wrapper Continuation-In-Part of U.S. application Ser. No. 08/092,601 filed Jul. 15, 1993 and now abandoned.

FIELD OF THE INVENTION

This invention relates generally to illumination devices and, more particularly, is directed towards a light reflecting device that simulates a neon light tube.

BACKGROUND OF THE INVENTION

Quite a variety of illumination devices exist for simulating neon-type lamps. The primary purpose of such devices is to retain the desirable aesthetic qualities of neon lamps but, at the same time, overcome many of the well known disadvantages of neon lamps, such as their cost, complexity, fragility, and so forth. Examples of such prior art devices may be found in U.S. Pat. No. 4,373,283 to Swartz on Feb. 15, 1983; and U.S. Pat. No. 2,486,859 to Meijer et al. on Nov. 1, 1949. Generally, these prior art neon-lamp devices take the form of a stationary display sign, such as might be used in a retail location window display, or the like. Further, many such prior art devices include a transparent plastic tubular element that has desirable light conducting qualities and tends to, when illuminated from one side, radiate light in a radially uniform manner from the other side, much like a neon tube.

While these devices, to some degree, are able to simulate a neon lamp, none come so close as to be particularly convincing. Such devices, for example, clearly are either illuminated from behind or from the front, and the illumination means employed is usually readily seen. Some of these prior art devices, in an attempt to shield the illumination means from direct observation, include an opaque barrier between the illumination tube elements. Yet such a solution results in an appearance quite unlike that of a neon sign, since one may readily see through the empty portions of a neon sign. Further, such prior art devices tend to be too bulky to carry conveniently by hand, or as attached to a garment, for example. Moreover, the luminance required to produce an effective neon simulation in such devices requires a relatively high-power illumination source that is impractical to operate from, for example, pen-light type batteries. Such drawbacks interfere with the wider use of such devices. One does not presently find, for instance, such devices being worn on hats, carried in shirt pockets, or the like.

Clearly, then, there is a need for an economical, low power, neon lamp simulation device that is more simulative of neon-type lamps than the prior art devices. Such a needed device would not require illumination from one side, but instead would be discretely illuminated from one end of a light-conducting tube, the light propagating through the tube. Such a device would better simulate a neon lamp. Further, such a needed device would be efficient enough to be battery operated, and as such could be made extremely portable. Further, such a needed device could be used with multiple colors along one illumination tube, unlike true neon lamps. Such a needed device would be made of a strong, non-shatterable material for improved safety. The present invention fulfills these needs and provides further related advantages.

SUMMARY OF THE INVENTION

The present invention is a light reflecting device that includes a transparent tube having two end surfaces and a cylindrical side wall. A light source includes both an illuminating light beam and a tube holding means that holds at least one of the end surfaces close to the light source so that the light beam propagates through at least one of the end surfaces and then along the tube. In one embodiment of the invention, the light source is positioned adjacent to one of the end surfaces of the tube, and a reflector is positioned adjacent to the other end surface, such that the light beam is reflected back into the tube at the other end surface. In another embodiment of the invention, the light source includes two light emitters, one of the emitters being positioned adjacent to each one of the end surfaces. In yet another embodiment of the invention, the tube is formed into a closed figure with the two end surfaces oriented next to each other such that the light beam enters through both end surfaces of the tube simultaneously. A color light filter may be positioned between the light source and the end surfaces of the tube so that the color of the light beam is selectable. At least one opaque thin film strip is adhered to or etched into a minor portion of the circumference of the outer surface for reflecting a portion of the light beam transversely through the tube such that the portion of the light beam is visible along the side wall of the tube.

The present invention is an economical, low power, neon lamp simulation device that is more simulative of neon-type lamps than the prior art devices. The present device is not illuminated from either the front or back side, but instead is discretely illuminated from at least one end of the tube and is therefore more simulative of true neon lamps. Further, the present device is efficient enough to be illuminated by a battery operated light source, and as such can be made extremely portable. Further, the present device can incorporate multiple colors of film strips along a single tube, making the present invention more versatile than true neon lamps. The present device can be made of a strong, non-shatterable material for improved safety, and may be formed into any number of desirable shapes easily. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
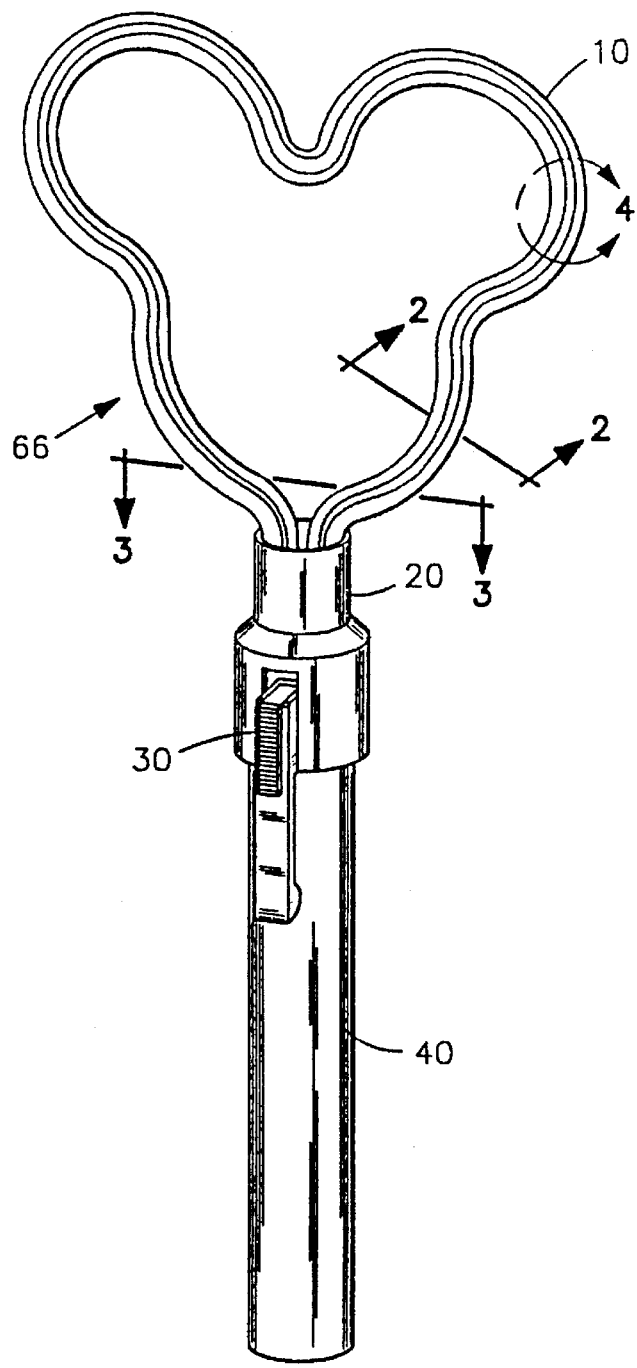
FIG. 1 is a perspective illustration of the invention, illustrating a tube of the invention formed into a closed shape.
Figure 2:
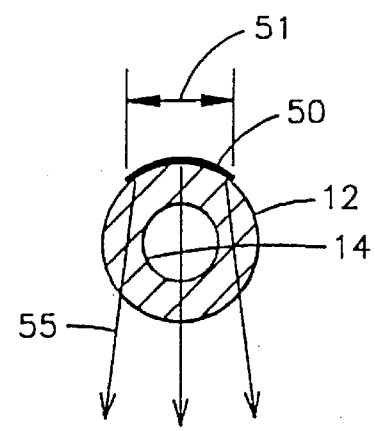
FIG. 2 is a cross sectional view of the invention, taken generally along lines 2—2 of FIG. 1, and illustrating a portion of a light beam as reflected from a film strip means adhered to or etched into a tube of the invention.

FIG. 1 shows a light reflecting device that includes a transparent tube 10 having a side wall 15. The side wall 15 includes an outer surface 12, an inner surface 14, and opposing end surfaces 16. The end surfaces 16 define an overall length of the side wall 15. The tube 10 is manufactured from a transparent light-conducting hollow tube 10, preferably extruded and easily formed into arbitrary shapes.

A base 60 includes a tube holding means 20, a power supply compartment 40, a switch 30, and a light source 70 that provides an illuminating light beam 75. In a portable embodiment of the invention, illustrated in FIG. 1, the power supply compartment 40 may hold several batteries (not shown). Clearly, however, other less-portable embodiments could be made by those skilled in the art wherein the base 60 includes a power cord for plugging into a conventional wall power outlet, or the like.

Figure 3:
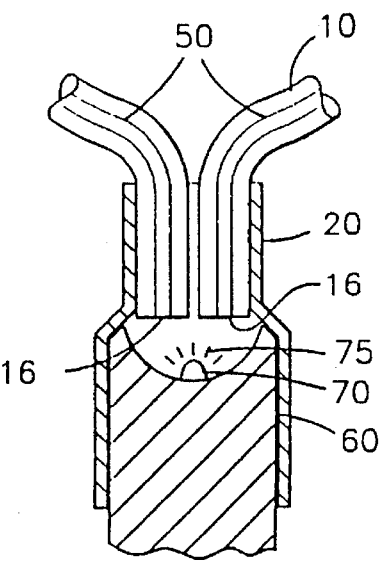
FIG. 3 is a cross sectional view of the invention, taken generally along lines 3—3 of FIG. 1, and illustrating a light source, a tube holding means, and opposing end surfaces of the tube of the invention.
Figure 5:
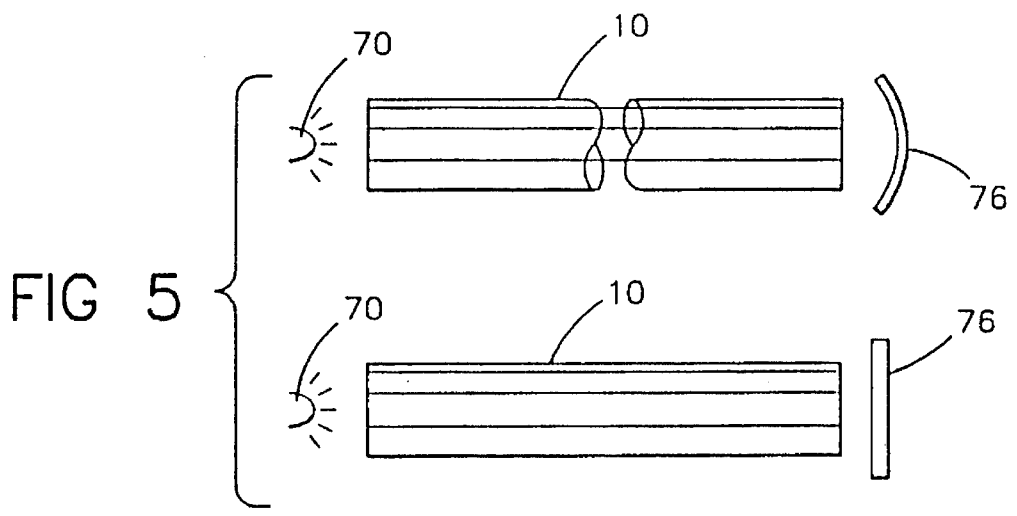
FIG. 5 is a diagrammatical view of the invention, illustrating an embodiment wherein a light source is located at one end of the tube and either a reflective parabolic or flat mirror is located at the other end of the tube.
Figure 6:
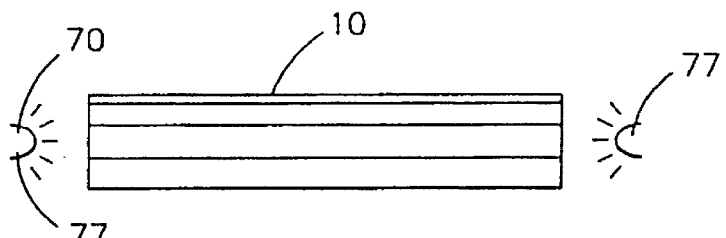
FIG. 6 is a diagrammatical view of the invention, illustrating an embodiment wherein a light emitter is located at each end of the tube.
Figure 7:
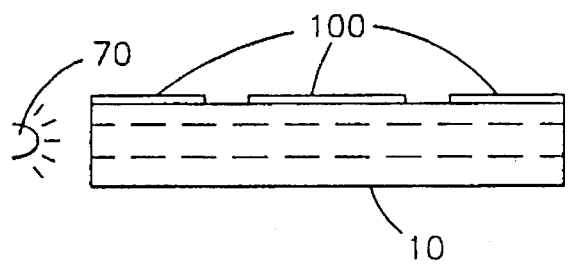
FIG. 7 is a diagrammatical view of the invention, illustrating an embodiment wherein separate film strip portions are located non-continuously along the tube.
Figure 8:
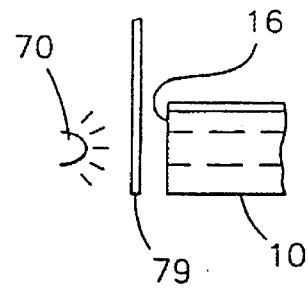
FIG. 8 is a diagrammatical view of the invention, illustrating a color filter located between the light source and one end of the tube.

The tube holding means 20 holds at least one of the end surfaces 16 in proximity to the light source 70 such that the light beam 75 propagates through at least one of the end surfaces 16 and thereafter along the tube 10. In one embodiment of the invention, the light source 70 is positioned adjacent to one of the end surfaces 16 of the tube 10, and a curved reflecting means 76 or a flat reflecting means 77 is positioned adjacent to the other of the end surfaces 16, such that the light beam 75 from the light source 70 is reflected back into the tube 10 at the other of the end surfaces 16 (FIG. 5). In another embodiment of the invention, one light source 70 is positioned adjacent to each one of the end surfaces 16 (FIG. 6). In yet another embodiment of the invention, shown in FIG. 1, the tube 10 is formed into a closed FIG. 66 with the two end surfaces 16 oriented mutually adjacent and coplanar such that the light beam 75 enters through both end surfaces 16 of the tube 10 simultaneously (FIGS. 1 and 3). Optionally, a light filter means 79 may be positioned between the light source 70 and at least one of the end surfaces 16 of the tube 10 so that the color of the light beam 75 is selectable by the choice of the filter means 79 (FIG. 8).

At least one opaque thin film strip means 50 is adhered to or etched into a minor portion of the circumference of the outer surface 12 for reflecting a portion 55 of the light beam 75 transversely to the tube 10 such that the portion 55 of the light beam 75 is visible through the side wall 15 tube 10. In one embodiment of the invention, the strip means 50 has a width 51 that varies with distance from, and is most narrow adjacent to, the light source 70. In one embodiment of the invention, the film strip means 50 comprises a plurality of separate strip portions 100 such that the portion 55 of the light beam 75 reflected transversely is visible only at the portions along the tube 10 wherein the separate strip portions 100 are positioned. In one embodiment of the invention, the film strip means 50 may be formed into the tube 10 by etching the sidewall 15 of the tube 10.

Figure 4:
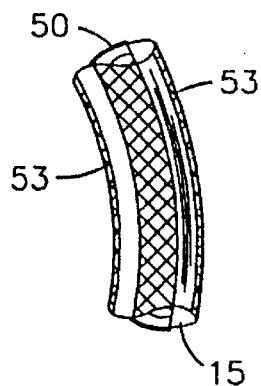
FIG. 4 is a partial perspective illustration, taken generally along lines 4—4 of FIG. 1, illustrating a reflection of the film strip means and two reflected images of the film strip means of the invention.

In the preferred embodiment of the invention, the outside and inside diameters of the tube are formed in the ratio of 2:1 and more particularly between 1.5 and 6 to 1. I have found that with such a range of ratios, an improved reflection of the strip means 50 is provided wherein the strip means 50 and two reflected images 53 of the strip means 50 are visible to an observer who is positioned opposite the strip means 50 (a directly opposing position) and is viewing the strip means 50 through the side wall 15 of the tube 10 (FIG. 4) and further, that off angle viewing, where the line of sight is up to 45 degrees away from the directly opposing position, to either side, strong reflected images 53 of the strip means 50 are visible to the observer. Such an embodiment provides an improved performance over that of either a solid rod or tubes 10 with different outside to inside diameter ratios from those cited above. It is found that for tube diameter ratios below 1.5, viewing from the directly opposing position produces no reflected images 53, while for ratios greater than 6, viewing from the directly opposing position produces a wide image due to magnification of light reflected through the convex near surface of the tube 10, but off-angle viewing suffers in the loss of significant reflected images. Therefore it is preferred to provide a tube 10 having a diameter ratio in the proportions as stated above in order to provide the optimum effect of reflected imaging when viewing the tube 10 from the side opposite the strip means 50 over a viewing angle range of up to 90 total degrees.

What is claimed is:

1. A light reflecting device comprising:
   a transparent tube having a side wall including an outer surface, an inner surface and opposing end surfaces, the end surfaces defining an overall length of the side wall, the outside and inside diameters of the tube being formed in the ratio of 2:1;
   a light source providing an illuminating light beam directed through at least one of the end surfaces and thence along the tube;
   at least one opaque thin film strip means adhered to a minor portion of the circumference of the outer surface for reflecting a portion of the light beam transversely such that said portion of the light beam is visible through the tube side wall as two reflected images of the strip means when the thin film strip is viewed through the tube.

2. The light reflecting device of claim 1 wherein the tube is formed into a closed figure with the two end surfaces oriented mutually adjacent and coplanar such that the light beam enters through both end surfaces of the tube simultaneously.

3. The light reflecting device of claim 1 wherein the strip means has a width, the width varying with distance from, and being most narrow adjacent to, the light source.

4. The light reflecting device of claim 1 wherein the light source is positioned adjacent to one of the end surfaces of the tube, and further including a reflecting means positioned adjacent to the other of the end surfaces for reflecting the light beam from the light source, back into the tube.

5. The light reflecting device of claim 1 wherein two light sources are included, one of the light sources being positioned adjacent to each one of the end surfaces.

6. The light reflecting device of claim 1 further including a light filter means positioned between the light source and the end surface of the tube whereby the color of the light beam is selectable by choice of said filter means.

7. The light reflecting device of claim 1 wherein the film strip means comprises a plurality of separate strip portions such that the portion of the light beam reflected transversely is visible only at the portions of the tube wherein said separate portions of the film strip means are positioned.

8. The light reflecting device of claim 1 wherein the film strip means is produced by a process taken from the group of processes including painting, coloring, etching, abraiding, and bonding.

9. A light reflecting device comprising:

a transparent tube having a side wall including an outer surface, an inner surface and opposing end surfaces, the end surfaces defining an overall length of the side wall, the outside and inside diameters of the tube being formed in the ratio of between 1.5 and 6 to 1;

a light source providing an illuminating light beam directed through at least one of the end surfaces and thence along the tube, at least one opaque thin film strip means adhered to a minor portion of the circumference of the outer surface for reflecting a portion of the light beam transversely such that said portion of the light beam is visible through the tube side wall as two reflected images of the strip means when the thin film strip is viewed through the tube.

* * * * *